(12) United States Patent
Saraf et al.

(10) Patent No.: US 8,637,607 B2
(45) Date of Patent: Jan. 28, 2014

(54) POLYETHYLENE BLENDS AND FILMS

(75) Inventors: Anil W. Saraf, Mason, OH (US); Stephen M. Imfeld, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 35 days.

(21) Appl. No.: 12/804,745

(22) Filed: Jul. 28, 2010

(65) Prior Publication Data
US 2012/0028017 A1 Feb. 2, 2012

(51) Int. Cl.
*C08F 8/00* (2006.01)
*C08L 23/00* (2006.01)
*C08L 23/04* (2006.01)

(52) U.S. Cl.
USPC .......................................... 525/191; 525/240

(58) Field of Classification Search
USPC .................................. 525/191, 240; 428/212
See application file for complete search history.

(56) References Cited

U.S. PATENT DOCUMENTS

| | | | |
|---|---|---|---|
| 4,086,204 A | 4/1978 | Cassandrini et al. | |
| 4,331,586 A | 5/1982 | Hardy | |
| 4,812,500 A | 3/1989 | Hayden | |
| 5,087,667 A * | 2/1992 | Hwo | 525/222 |
| 5,100,978 A | 3/1992 | Hasenbein et al. | |
| 5,376,439 A * | 12/1994 | Hodgson et al. | 428/220 |
| 6,306,996 B1 | 10/2001 | Cecchin et al. | |
| 6,355,733 B1 * | 3/2002 | Williams et al. | 525/191 |
| 6,887,955 B2 | 5/2005 | Deckers et al. | |
| 2004/0054097 A1 | 3/2004 | Maehling et al. | |
| 2005/0064161 A1 | 3/2005 | Ravel et al. | |

OTHER PUBLICATIONS http://en.wikipedia.org/wiki/Medium-density_polyethylene Cited as evidence, taken from the world wide web on Jun. 14, 2013.*

* cited by examiner

*Primary Examiner* — Nathan M Nutter

(57) ABSTRACT

Disclosed are polyethylene blends and films. The blend comprises from 1 to 99%, based on the weight of the blend, of a medium density polyethylene (MDPE) and from 1 to 99% a polyolefin selected from the group consisting of high density polyethylene (HDPE), linear low density polyethylene (LL-DPE), low density polyethylene (LDPE), polypropylene, polybutene, and mixtures thereof. The MDPE is made by high pressure, free radical polymerization and has a density within the range of greater than 0.928 to 0.940 g/cm$^3$ and an MI$_2$ within the range of 0.1 to 1 dg/min. The shrink films made from the blend have strong contraction force and low creep.

13 Claims, No Drawings

POLYETHYLENE BLENDS AND FILMS

FIELD OF THE INVENTION

The invention relates to polyethylene blends and films. More particularly, the invention relates to a polyethylene blend which comprises a medium density polyethylene (MDPE) made by high pressure, free radical polymerization and a collation shrink film made therefrom.

BACKGROUND OF THE INVENTION

Polyethylene is divided into high density (HDPE, density 0.941 g/cm$^3$ or greater), medium density (MDPE, density from 0.926 to 0.940 g/cm$^3$), low density (LDPE, density from 0.910 to 0.925 g/cm$^3$) and linear low density polyethylene (LLDPE, density from 0.910 to 0.925 g/cm$^3$). See ASTM D4976-98: Standard Specification for Polyethylene Plastic Molding and Extrusion Materials. Linear polyethylene, including HDPE, MDPE, and LLDPE, is generally made by coordination catalysts such as Ziegler-Natta and single-site catalysts, while branched polyethylene, LDPE, is made by free radical polymerization at high pressure. For linear polyethylene, the density varies with the quantity of comonomers used with ethylene. The comonomer forms short-chain branches along the ethylene backbone, and since branches create separation between the ethylene backbone, the greater the quantity of comonomer, the lower the density of the polymer. On the other hand, the density of branched polyethylene depends on the closeness and regularity of the packing of the long-chain branches, and is varied through changes in the reactor pressure and heat. Therefore, the density of branched polyethylene cannot be broadly varied and HDPE and MDPE resins are generally not made by high pressure, free radical polymerization.

Compared with LLPDE, LDPE has a unique combination of properties including high shrink characteristics, processability, and film transparency. These unique attributes of LDPE largely result from its long-chain branched structure. MDPE resins have been made recently by high pressure, free radical polymerization. See U.S. Pat. Appl. Pub. No. 2004/0054097. Unlike the traditional MDPE, which are copolymers of ethylene with α-olefin comonomers, these new MDPE resins are highly branched ethylene homopolymers. They combine the attributes of traditional MDPE and LDPE. However, these new MDPE resins are more expensive to make because they require unique polymerization conditions and they are currently used in limited areas such as medical and cosmetic applications. The new MDPE resins made by high pressure, free radical polymerization, have many unique properties and they offer new opportunities for improvement of polyethylene films.

SUMMARY OF THE INVENTION

The invention relates to polyethylene blends and films. The blend comprises from 1 to 99%, based on the weight of the blend, of a medium density polyethylene (MDPE) and from 1 to 99% a polyolefin selected from the group consisting of high density polyethylene (HDPE), linear low density polyethylene (LLDPE), low density polyethylene (LDPE), polypropylene, polybutene, and mixtures thereof. The MDPE is made by high pressure, free radical polymerization and has a density within the range of greater than 0.928 to 0.940 g/cm$^3$, an MI$_2$ within the range of 0.1 to 1 dg/min. The invention also includes collation shrink films made from the blends. The collation shrink films have a combination of clarity and physical strength such as modulus, contraction force and creep resistance.

DETAILED DESCRIPTION OF THE INVENTION

The blend of the invention comprises from 1 to 99 wt %, preferably from 50 to 95 wt %, and more preferably from 75 to 95 wt %, based on the weight of the blend, of a medium density polyethylene (MDPE). The MDPE is made by a high pressure, free radical polymerization. Methods for preparing MDPE by high pressure, free radical polymerization are known. For instance, U.S. Pat. Appl. Pub. No. 2004/0054097, the teachings of which are incorporated herein by reference, teaches a method for producing ethylene homopolymers and copolymers in a tubular reactor having at least two polymerization zones, at a temperature within the range of 150° C. and 350° C. and pressure within the range of 500 and 5000 bar, using oxygen as a free radical initiator. The method uses an aliphatic ketone as a molecular weight regulator. An example of suitable MDPE for use in the invention is Petrothene L3035 from Equistar Chemicals, LP.

Preferably, the MDPE is an ethylene homopolymer. The MDPE has a density within the range of 0.928 to 0.940 g/cm$^3$, preferably within the range of 0.929 to 0.939 g/cm$^3$, and more preferably within the range of 0.929 to 0.934 g/cm$^3$. The MDPE has a melt index MI$_2$ within the range of 0.1 to 1 dg/min, and preferably within the range of 0.2 to 0.7 dg/min. Densities and MI$_2$ are determined in accordance with ASTM 1505 and 1238 (condition 190/2.16), respectively. These methods are used to measure densities and MI$_2$ of all of the polymers used in this application unless indicated otherwise.

The blend of the invention comprises from 1 to 99 wt %, preferably from 5 to 50%, and more preferably from 5 to 25 wt %, of a polyolefin selected from the group consisting of high density polyethylene (HDPE), linear low density polyethylene (LLDPE), low density polyethylene (LDPE), polypropylene, polybutene, the like, and mixtures thereof. Suitable HDPE includes ethylene homopolymers and copolymers of ethylene and α-olefins. Suitable α-olefins include 1-butene, 1-hexene, and 1-octene, the like, and mixtures thereof. Preferably, the α-olefin content in the HDPE is less than 2 wt %. The HDPE has a density preferably within the range of 0.940 to 0.970 g/cm$^3$, and more preferably within the range of 0.945 to 0.965 g/cm$^3$. The HDPE has a melt index MI$_2$ preferably within the range of 0.001 to 100 dg/min, and more preferably within the range of 0.05 to 50 dg/min. The HDPE can be multimodal. By "multimodal," we mean that the HDPE comprises at least two components, one of which has a relatively low molecular weight, and the other has a relatively high molecular weight. Many HDPE resins are commercially available, for instance L5885 and M6020 HDPE resins from Equistar Chemicals, LP.

Suitable LLDPE for use in the blend of the invention can be prepared with Ziegler-Natta, single-site, and any other suitable catalysts. They include copolymers of ethylene and one or more $C_3$ to $C_{10}$ α-olefins. Suitable α-olefins include 1-butene, 1-hexene, and 1-octene, the like, and mixtures thereof. The density of LLDPE is preferably within the range of 0.865 to 0.940 g/cm$^3$, more preferably within the range of 0.910 to 0.940 g/cm$^3$, and most preferably within the range of 0.915 to 0.935 g/cm$^3$. The LLDPE preferably has a melt index MI$_2$ within the range of 0.1 to 10 dg/min, and more preferably within the range of 0.5 to 8 dg/min. A particularly preferred LLDPE resin is a copolymer of ethylene and 1-butene having 1-butene content within the range of 2 to 20 wt %. The ethylene-1-butene copolymer preferably has a density from 0.912 to 0.925 g/cm$^3$ and, more preferably, from 0.915 to 0.920 g/cm$^3$. The ethylene-1-butene copolymer preferably has an MI$_2$ within the range of 0.5 to 15 dg/min and, more preferably, from 1 to 10 dg/min.

Suitable LDPE for use in the invention include those known to the industry. LDPE is usually made by free radical polymerization under high pressure. There are two basic processes for the manufacture of LDPE: autoclave and tubular. Both autoclave LDPE and tubular LDPE are suitable for use in the invention. The LDPE has a density preferably within the range of 0.910 to 0.925 g/cm$^3$, and more preferably within the range of 0.915 to 0.925 g/cm$^3$. The LDPE has a melt index MI$_2$ preferably within the range of 0.1 to 100 dg/min, and more preferably within the range of 0.5 to 50 dg/min. Many LDPE resins are commercially available and suitable for use in the blend of the invention. An example of suitable LDPE resin is Petrothene NA940 from Equistar Chemicals, LP. Suitable LDPE includes ethylene-vinyl acetate copolymers (EVA). EVA is made by free radical copolymerization of ethylene and vinyl acetate. Suitable EVA comprises preferably from 2 to 30 wt % of vinyl acetate, and more preferably from 5 to 18 wt % of vinyl acetate. The suitable EVA has a melt index MI$_2$ preferably within the range of 2 to 500 dg/min. Many EVA resins are commercially available, for instance, EVA UE624 is available from Equistar Chemicals, LP.

Suitable polypropylene includes amorphous polypropylene, semi-crystalline polypropylene, the like, and mixtures thereof. Preferably, the semi-crystalline polypropylene is selected from the group consisting of propylene homopolymers, copolymers of propylene with at least one other C$_2$ to C$_{10}$ α-olefin, the like, and mixtures thereof. Copolymers of propylene include random copolymers and impact copolymers. Preferred α-olefins for such copolymers include ethylene, 1-butene, 1-pentene, 1-hexene, methyl-1-butenes, methyl-1-pentenes, 1-octene, 1-decene, the like, and mixtures thereof. "Semi-crystalline," as used herein, means that the crystallinity is greater than or equal to 40%, preferably greater than or equal to 55%, and more preferably greater than or equal to 80%. Preferably, the semi-crystalline polypropylene has a melt flow rate (as determined by ASTM D-1238-01 at a temperature of 230° C. and at a load of 2.16 kg) within the range of 0.001 dg/min to 500 dg/min. Preferably, the semi-crystalline polypropylene has a density within the range of 0.897 g/cm$^3$ to 0.925 g/cm$^3$ and a weight average molecular weight (Mw) within the range of 85,000 to 900,000.

Suitable polybutene includes homopolymers of 1-butene, copolymers of 1-butene with at least one other C$_2$ to C$_{10}$ α-olefin, the like, and mixtures thereof. Preferred α-olefins for such copolymers include ethylene, propylene, 1-pentene, 1-hexene, methyl-1-butenes, methyl-1-pentenes, 1-octene, 1-decene, the like, and mixtures thereof. The polybutene has an MI$_2$ preferably within the range of 0.01 dg/min to 1000 dg/min, more preferably within the range of 0.1 dg/min to 750 dg/min. Methods for producing polybutene are known. For instance, see U.S. Pat. No. 6,306,996, the teachings of which are herein incorporated by reference.

LLDPE and HDPE are preferred polyolefins for making the blend of the invention. Preferably, the LLDPE is made by a single-site catalyst (i.e., sLLDPE).

Optionally, the blend also contains antioxidants, UV-absorbents, flow agents, or other additives. The additives are well known in the art. For example, U.S. Pat. Nos. 4,086,204, 4,331,586 and 4,812,500, the teachings of which are herein incorporated by reference, teach UV stabilizers for polyolefins. Additives are added in an amount preferably less than 10 wt % of the total blend.

Any suitable blending technique can be used. The polymers and optional additives can be blended in solution or in thermal processing. Melt screw extrusion is preferred.

The invention includes articles comprising the blend of the invention, including films, sheets, pipes, containers, bags, liners, etc. One particular application of the invention is the collation shrink films made from the blends. Collation shrink films are used for bonding packages such as water bottles. The collation shrink films of the invention exhibit a unique combination of high clarity, strong contraction force, low creep, and high rigidity. The collation film of the invention can be either a monolayer film or multilayer films. For monolayer film of the invention, the blend preferably comprises from 50 to 90 wt %, more preferably from 75 to 90 wt %, of the MDPE and preferably from 10 to 50 wt %, and more preferably from 10 to 25 wt % of sLLDPE. Preferred multilayer film is a three layer film comprising two outer layers and one core layer. The outer layers are made from a blend of MDPE and sLLDPE which preferably comprises from 5 to 25 wt %, more preferably from 5 to 15 wt % of the MDPE. The core layer is made from a blend of MDPE and HDPE which preferably comprises from 75 to 95 wt % of MDPE.

Methods for making collation shrink films are known. For example, the blown film process can be used to produce biaxially oriented collation shrink films of the invention. In the process, polyethylene melt is fed by an extruder through a die gap (0.025 to 0.100 in) in an annular die to produce a molten tube that is pushed vertically upward. Pressurized air is fed to the interior of the tube to increase the tube diameter to give a "bubble." The volume of air injected into the tube controls the size of the tube or the resulting blow-up ratio, which is typically 1 to 3 times the die diameter. In low stalk extrusion, the tube is rapidly cooled by a cooling ring on the outside surface and optionally also on the inside surface of the film. The frost line height is defined as the point at which the molten extrudate solidifies. This occurs at a height of approximately 0.5-4 times the die diameter. The draw down from the die gap to the final film thickness and the expansion of the tube diameter result in the biaxial orientation of the film that gives the desired balance of film properties. The bubble is collapsed between a pair of nip rollers and wound onto a film roll by the film winder. Collapsing of the tube is done after initial cooling at a point so that the wall surfaces will not adhere to one another. Physical properties of the film are defined in two directions, along the polymer flow exiting the die or machine direction (MD) and perpendicular to the polymer flow exiting the die or transverse direction (TD).

The following examples merely illustrate the invention. Those skilled in the art will recognize many variations that are within the spirit of the invention and scope of the claims.

EXAMPLE 1

Blend and Monolayer Collation Shrink Film of the Invention

An MDPE (ethylene homopolymer) prepared by high pressure, free radical polymerization (80 parts by weight) is blended by extrusion with a single-site sLLDPE (20 parts by weight). The MDPE has a density of 0.930 g/cm$^3$ and MI$_2$ of 0.40 dg/min. The sLLDPE has an MI$_2$ of 1.0 dg/min and density 0.918 g/cc. The blend is converted into a film with a thickness of 2.0 mils on a 6" die with 60 mils of die gap. The film is produced at a blow up ratio (BUR) of 3:1. The film has a stiffness of 90 lbs/in (stiffness=modulus×film thickness), NAS (ASTM D1746, Zebedee narrow angle scatter) of 64, haze of 9% (ASTM D1003), MD modulus of 5,000 psi (ASTM E111), TD modulus of 4,100 (ASTM E111), MD tear of 310 g (ASTM D1922 Elmendorf Tear), TD tear of 1,100 g (ASTM D1922 Elmendorf Tear), contraction force of 121 g (ISO 14616), and shrinkage @ 135° C. of 80% (ASTM D2732 Unrestrained Linear Shrink in oven at 135 C).

COMPARATIVE EXAMPLE 2

Blend and Monolayer Collation Shrink Film Containing No MDPE

An LDPE (ethylene homopolymer, 75 parts by weight), sLLDPE (20 parts by weight), and an HDPE (5 parts by weight) are blended by extrusion. The LDPE has a density of 0.924 g/cm³ and MI$_2$ of 0.75 dg/min. The sLLDPE is the same as that described in Example 1. The HDPE has a density of 0.960 g/cm³ and MI$_2$ of 2.9 dg/min. The blend composition is designed to achieve a comparable film properties such as shrinkage and contraction force required for collation shrink films. In this blend composition, the HDPE is a necessary component for achieving the film rigidity, i.e., modulus and stiffness. A 2.5 mil film is produced using the same process as described in Examples 1 except the film thickness. Note that the film thickness of 2.5 mils in Comparative Example 2 is necessary to achieve film properties such as shrinkage and contraction force comparable to the 2.0 mile film of Example 1. The film has a stiffness of 90 lbs/in, NAS (narrow angle scattering) of 48, haze of 11%, MD modulus of 4,300 psi, TD modulus of 3,800, MD tear of 420 g, TD tear of 1,100 g, contraction force of 116 g, and shrinkage @ 135° C. of 80%. As these results indicate, this comparative film has significantly lower modulus and transparency (measured by NAS) than the film of Example 1.

EXAMPLE 3

Blend and Three-Layer Collation Shrink Film of the Invention

A three-layer collation film is made by co-extrusion. The film has two outer layers and one core layer. The outer layers are made from a blend of sLLDPE (90 parts by weight) and MDPE (10 parts by weight) and the core layer is made from a blend of MDPE (80 parts by weight) and HDPE (20 parts by weight). The MDPE, LLDPE, and HDPE are the same as described in above Example 1 and Comparative Example 2. The film has a total thickness of 2.5 mils; the core layer is 65%, and each outer layer is 17.5% of the total thickness. The film has an NAS of 55, 1% secant MD modulus of 52,400 psi (ASTM E111), 1% secant TD modulus of 62,800 (ASTM E111), and MD shrinkage @ 135° C. of 76%.

COMPARATIVE EXAMPLE 4

Three-Layer Collation Shrink Film in which the Core Layer does not Contain MDPE

Example 3 is followed but the MDPE in the core layer is replaced by LDPE. The LDPE is the same as described in Comparative Example 2. The film has an NAS of 46, 1% secant MD modulus of 42,600 psi, 1% secant TD modulus of 50,000, and MD shrinkage @ 135° C. of 76%.

COMPARATIVE EXAMPLE 5

Example 1 is followed but the MDPE (ethylene homopolymer) prepared by high pressure, free radical polymerization is replaced by an MDPE (ethylene-α-olefin copolymer) made by Ziegler-Natta catalyst. The film is expected to have lower shrinkage, low contraction force, lower gloss, and higher haze than the film of Example 1. It is not suitable for shrink films where high shrinkage, high contraction force, and high clarity are required.

We claim:

1. A collation shrink film having:
    a thickness of 2.0 mm, a stiffness of about 90 lbs/in and a shrinkage of 80% at 135° C.;
    wherein the film comprises a blend of:
    (a) 50% to 95%, based on the weight of the blend, of a medium density polyethylene (MDPE) homopolymer which is made by high pressure, free radical polymerization and has a density within the range of greater than 0.928 to 0.940 g/cm³, an MI1$_2$ within the range of 0.1 to 1 dg/min; and
    (b) 5% to 50%, based on the weight of the blend, of a polyolefin selected from the group consisting of:
    (i) a high density polyethylene (HDPE),
    (ii) a linear low density polyethylene (LLDPE),
    (iii) a low density polyethylene (LDPE),
    (iv) a polypropylene,
    (v) a polybutene, and mixtures thereof.

2. The collation shrink film of claim 1, wherein the MDPE has a density within the range of 0.929 to 0.939 g/cm³.

3. The collation shrink film of claim 2, wherein the MDPE has a density within the range of 0.929 to 0.934 g/cm³.

4. The collation shrink film of claim 2, wherein the MDPE has an MI$_2$ within the range of 0.2 to 0.7 dg/min.

5. The collation shrink film of claim 1, wherein the polyolefin is selected from the group consisting of LLDPE, HDPE, and mixtures thereof.

6. The collation shrink film of claim 5, wherein the polyolefin is a single-site LLDPE (sLLDPE).

7. The collation shrink film of claim 1, which comprises 75% to 95% of the MDPE and 5% to 25% of the polyolefin.

8. The collation shrink film of claim 7, wherein the polyolefin is a sLLDPE.

9. The collation shrink film of claim 1 wherein the film comprises as least one layer.

10. The collation shrink film of claim 9 wherein the film is a monolayer film.

11. The collation shrink film of claim 9 wherein the film is a three-layer film which comprises two outer layers and a core layer, wherein the outer layers comprise a blend of from 5% to 95% of the MDPE and from 5% to 95% of a sLLDPE, and the core layer comprises from 75% to 95% of the MDPE and from 5% to 25% of an HDPE or LLDPE.

12. The collation shrink film of claim 11, wherein the MDPE has a density within the range of 0.929 to 0.934 g/cm³ and an MI$_2$ within the range of 0.3 to 0.6 dg/min.

13. The collation shrink film of clam 1 wherein the film is in the form of film, a sheet, a pipe, a container, a bag, a liner, or combinations thereof.

* * * * *

UNITED STATES PATENT AND TRADEMARK OFFICE
CERTIFICATE OF CORRECTION

| | | |
|---|---|---|
| PATENT NO. | : 8,637,607 B2 | Page 1 of 1 |
| APPLICATION NO. | : 12/804745 | |
| DATED | : January 28, 2014 | |
| INVENTOR(S) | : Anil W Saraf et al. | |

It is certified that error appears in the above-identified patent and that said Letters Patent is hereby corrected as shown below:

Specification

| | | |
|---|---|---|
| Column 2 | Line 34 | Delete "5 to 50%," and insert --5 to 50 wt %,-- |
| Column 4 | Line 62 | Delete "0.918 g/cc." and insert --0.918 g/cm$^3$.-- |
| Column 5 | Line 5 | Delete "135 C" and insert --135° C.-- |
| Column 5 | Line 24 | Delete "Examples 1" and insert --Example 1-- |

Claims

| | | |
|---|---|---|
| Column 6 | Line 22 | In Claim 1, delete "MI1$_2$" and insert --MI$_2$-- |
| Column 6 | Line 46 | In Claim 9, delete "as" and insert --at-- |

Signed and Sealed this
First Day of March, 2016

Michelle K. Lee
*Director of the United States Patent and Trademark Office*